United States Patent [19]

Jakahi

[11] Patent Number: 4,546,757
[45] Date of Patent: Oct. 15, 1985

[54] FIXED POSITION CONCENTRATING SOLAR COLLECTOR

[76] Inventor: Douglas Y. Jakahi, 94-037 Huo Pl., Mililani Town, Hi. 96789

[21] Appl. No.: 668,085

[22] Filed: Nov. 5, 1984

Related U.S. Application Data

[63] Continuation-in-part of Ser. No. 398,911, Jul. 16, 1982, which is a continuation of Ser. No. 229,512, Jan. 29, 1981, abandoned.

[51] Int. Cl.$^4$ .................................. F24J 3/02
[52] U.S. Cl. ............................. 126/438; 126/425; 126/439
[58] Field of Search ............... 126/418, 419, 422, 438, 126/439, 424, 425; 350/288, 292, 293, 299, 359, 363, 484, 487, 486, 266, 269, 275

[56] References Cited

U.S. PATENT DOCUMENTS

| | | | |
|---|---|---|---|
| 2,595,905 | 5/1952 | Telkes | 126/428 |
| 2,857,634 | 10/1958 | Garbade et al. | 126/419 X |
| 3,953,110 | 4/1976 | Charoudi | 126/441 X |
| 4,024,852 | 5/1977 | L'Esperance et al. | 126/438 |
| 4,066,062 | 1/1978 | Houston | 126/419 X |
| 4,102,329 | 3/1979 | Kapany et al. | 126/438 X |
| 4,159,706 | 7/1979 | Mahdjuri | 126/438 X |
| 4,192,292 | 3/1980 | Root | 126/419 X |
| 4,215,674 | 8/1980 | Riggs et al. | 126/438 |
| 4,233,958 | 11/1980 | Heden | 126/424 |
| 4,237,864 | 12/1980 | Kravitz | 126/438 X |

Primary Examiner—Larry Jones
Attorney, Agent, or Firm—Schapp and Hatch

[57] ABSTRACT

A fixed position concentrating solar collector in the form of a trough having an inner surface reflective to solar radiation and formed to direct the sun's rays entering the trough onto a radiation absorber element, the trough having end structures capable of selectively reflecting solar radiation into the trough or of being made transparent for passing solar radiation into the trough which would otherwise be blocked off by the trough end. Devices responsive to the position of the sun relative to the trough automatically control clearness-reflectiveness of the trough ends. End structures include flexible sheets on a roller, movable ends, jointly movable slats, leaves which may be aligned or fanned out, inflatable bags and flexible sheets controlled by bourdon tubes. A highly efficient configuration of the trough reflecting surface has a transverse plane profile defined by a compound parabolic curve comprising a half parabola joined to the other half of the parabola by a quarter circle shifted 90° with respect to the first half, the distance between the focus of the parabola being equal to the radius of the quarter circle and the focus of both of the half parabolas and the circle being in the same position.

25 Claims, 37 Drawing Figures

FIXED POSITION CONCENTRATING SOLAR COLLECTOR

This is a continuation-in-part of my copending application, Ser. No. 06/390,911, filed July 16, 1982, which is a continuation of my application, Ser. No. 06/229,512, filed Jan. 29, 1981, now abandoned.

BACKGROUND OF THE INVENTION

1. Field of the Invention

The present invention relates to solar energy collectors, and more particularly to trough-type collectors having reflective surfaces internally of the trough for focusing sun's rays entering the trough onto a radiation receiver. The present invention is particularly suitable for fixed installations, that is, for stationary mounting which does not track the apparent motion of the sun.

2. Description of the Prior Art

It has previously been known to collect solar radiation in trough shaped apparatus lined with reflecting surfaces and arranged to concentrate or focus solar radiation entering the trough upon a receiving structure such as heat exchangers, thermoelectric devices, photoelectric devices, and the like. Such troughs are usually of semi-cylindrical configuration or of V-shaped cross section.

It has been proposed to make a trough-shaped solar concentrator utilizing a transverse plan profile curve in the form of spaced double parabolas having focus at the opposite edge of the exit aperture and axis of parabola inclined at an angle $\theta_{max}$ with respect to the optic axis (see "Principles of Solar Collectors of a Novel Design" by Roland Winston, published in *Solar Energy*, Volume 16, pages 89–95, by the Pergamon Press, 1974, printed in Great Britian).

Some of the known trough-type collectors, of whatever cross sectional profile, have reflective ends and others have open or transparent ends. None of the prior art makes one end transparent for admitting sunlight which otherwise would be blocked off by a closed end and at the same time makes the opposite end capable of reflecting back into the trough sunlight which otherwise would not be so reflected.

SUMMARY OF THE INVENTION

The solar collector of the present invention provides more efficient concentration of solar radiation than other trough-type collectors of comparable size, both by making the ends of the trough selectively reflective of and transparent to, solar radiation, and by providing a novel and highly efficient trough configuration.

I have discovered that significant amounts of solar energy are blocked off from the sunward end of the trough when the trough end is opaque. I have also observed that significant amounts of otherwise non-recoverable solar energy are bounced back into the trough when the end opposite to the sun is provided with a reflective surface. I have found that providing reflective end structures across the trough ends increases performance of the solar collector over a comparable trough having opaque ends, and removing the end structures or making them transparent also increases solar collecting ability of the trough. However, making the sunward end clear, to admit sunlight to the trough interior, and the other end reflective, to reflect sunlight back to the interior of the trough, provides marked increase of efficiency over the both ends opaque and both ends clear configurations.

Ordinarily, an elongated fixed trough-type collector will be mounted to extend east and west. According to the present invention, the trough end structure on the east side of the trough is removed or made transparent to solar radiation during the morning hours, and during the same period the opposite end is made reflective. At approximately noontime, the reflective-clear characteristics of the end structures are reversed so that the westward end structure is removed or made transparent to solar radiation while the eastward end structure is made reflective.

Where the trough collector is oriented to extend in a north-south direction, it normally is tilted to an angle perpendicular to the position of the sun at the equinoxes, so that maximum sunlight will enter the trough during the annual cycle. During the winter months, the southern end structure of the trough will be removed or rendered transparent to solar radiation, and the northern end structure will be made reflective, the northern end structure being removed or made transparent to solar radiation and the southern end structure being made reflective during the summer months.

While various configurations may be given to the solar collecting trough, such as a cylindrical configuration, I have found that the shape of the reflective surface of the trough interior is quite significant with regard to the efficiency of the trough in concentrating the sun's rays. The cross sectional profile of the reflective surface which I have found to be most efficient, taking into account both practical and theoretical considerations, is defined by one half of a parabola joined by a quarter circle to the other half of the parabola shifted ninety degrees with respect to the first half. The distance between the focus of the parabola and its vertex is equal to the radius of a quarter circle and the focus of both of the half parabolas and the circle coincide with a radiation absorption element.

One of the big advantages of concentrating solar collectors over flat plate solar collectors is that the reflecting surfaces can be built at less cost than absorbing surfaces for solar collectors. Thus, if a fixed concentrating solar collector is provided with good performance over a wide range of angles of incoming solar radiation, the resulting fixed solar collector has a higher efficiency than a conventional flat plate solar collector. This is due to less heat radiating area, a higher temperature capability due to less heat radiating area and, because it uses less costly reflective surfaces in place of more costly solar radiation absorption surfaces and because it does not need to track the sun, such collector can be less expensive per unit area in comparison to a flat plate solar collector.

The solar collector of the present invention provides added efficiency through the use of a solar radiation absorption element in which the portions of the element being heated by solar energy do not transmit such energy to the unheated portions from whence heat energy could be lost by unwanted radiation. This is accomplished by forming the ordinarily plate-like absorption element from a series of coplanar parallel plate strips physically separated from each other and providing a tube along each of such strips to convey the heat absorption fluid, the individual tubes being formed to feed into single supply and discharge tubes.

Because of the low location of the solar radiation absorption element in the trough, the solar collector of the present invention works very well in a thermosiphon solar hot water system. The location of the receiver low in the trough allows a storage tank to be also in a relatively low location.

While the solar collector trough of the present invention having the described compound parabolic curve configuration may be used without utilizing the described selectively transparent and reflective end surfaces, and while troughs of different configuration may be used with the described reflective clear end structures, use of both of these features in conjunction markedly increases the utility of the solar collector of the present invention in terms of efficiency. Also, while the ends of the trough can be made transparent or reflective manually, as by simply swapping one end structure between the ends of the trough, further effectiveness is accomplished by making automatic the changeover between clear and reflective.

Various means are utilized for accomplishing the clear-reflective changeover, among them being a flexible reflective sheet carried on a roller somewhat in the manner of a window shade so that the reflective sheet can be pulled into covering relation across the end of the trough or wound up on the roller to uncover the end of the trough. Another end structure for accomplishing similar results is somewhat in the form of a venetian blind having reflective slats mounted across the trough end and movable between a position generally edgewise to the sun, for admitting the sun's rays to the trough between the slats, and a position covering the end of the trough, for making such end reflective.

Another end structure has a plurality of thin, tapered reflective leaves which can be fanned out across the trough end to provide the reflective surface, and can be gathered together in overlapping relation clearing the end of the trough to thus make the end transparent. Another form of end structure is in the configuration of a folding fan having a plurality of elongated stiffeners pivoted at one end around a common axis in overlapping relation and joined by a flexible web. When extended, the reflective surfaces on the fan provide the reflective end and, when folded, the trough end is left open for entry of solar radiation.

Another contemplated end structure is in the form of inflatable bags providing a reflective surface formed to extend substantially across the width of the trough when inflated and to be retracted so as to leave the trough end substantially open when not inflated. A further contemplated form of end structure utilizes a flexible reflective sheet having a bourdon tube or tubes attached thereto in such a manner that the sheet extends substantially across the tube end when the bourdon tube is straightened out by internal fluid pressure and is substantially retracted from the trough end when the bourdon tube is permitted to coil itself up by lack of internal fluid pressure.

It is also contemplated that the operation of the end structures is provided automatically in response to the position of the sun relative to the trough. This is conveniently accomplished by the use of timing devices synchronized with the apparent movement of the sun, and may also be accomplished by devices which sense and are responsive to solar radiation, such as bimetallic elements impinged upon by, or shaded from, solar radiation at the desired relative locations of the sun.

It is therefore a principal object of the present invention to provide a fixed concentrating solar collector having a solar radiation collection trough provided with a reflective surface concentrating and focusing the rays of the sun on a solar radiation absorption device, and having provision for selectively rendering the ends of the trough transparent to or reflective to solar radiation.

Another object of the present invention is to provide a fixed concentrating solar collector of the character described in which the ends of the collector trough are automatically rendered reflective or transparent to solar radiation in accordance with the position of the sun relative to the trough.

A further object of the present invention is to provide a fixed concentrating solar collector having an internal transverse profile in the form of a compound parabolic curve for maximizing solar energy collecting efficiency of the trough.

A still further object of the present invention is to provide a trough-type fixed concentrating solar collector having end structures readily changeable from clear to reflective.

Yet another object of the present invention is to provide a trough-type fixed concentrating solar collector of the character described which is particularly suitable for use with a thermosiphon warm water system for utilizing the heat energy collected by the trough.

A further object of the present invention is to provide a trough-type fixed concentrating solar collector of the character described having a solar radiation absorption device in which absorbed solar energy is not radiated from the portion thereof not being impinged by solar radiation at any particular time.

For a fuller understanding of the nature and further objects and features of advantage of the present invention, reference should be had to the following detailed description, taken in connection with the accompanying drawings and the appended claims.

BRIEF DESCRIPTION OF THE DRAWINGS

FIG. 15 is a view similar to that of FIG. 11, but illustrating another modified form of trough end structure.

FIG. 16 is a view similar to that of FIG. 15, but illustrating the trough end structure in deflated configuration.

While only the preferred embodiments of the invention have been illustrated in the drawings, it will be apparent as the specification progresses that modifications could be made to the illustrated structure within the ambit of the claims.

DESCRIPTION OF THE PREFERRED EMBODIMENTS

Referring now to the drawings in detail, it will be seen that the fixed position concentrating solar collector of the present invention includes a structure 31 providing an open trough 32 mountable in position to admit the rays 33 of the sun 34 to the interior of the trough, and reflective surfaces 36 on the interior of the trough 32 formed for directing the sun's rays entering the trough onto a focal area occupied by a radiation absorber element 37.

Preferably, the reflective surfaces 36 are curved and the trough is of substantially uniform cross-section along its length. It should be appreciated, however, that the surfaces 36 could be other than curved, as for example a series of flat surfaces angularly related to each other to reflect the rays of the sun into the desired focal area. Also, the trough may be other than of substantially uniform cross-section along its length, while still utilizing certain principles of the present invention.

In accordance with the present invention, the opposite ends of the trough 32 are selectively reflective or transparent to solar radiation. "Transparent" means that solar radiation can pass into the trough 32 through the "transparent" end of the trough either because that trough end is open or partially open or because an end structure across such end physically passes solar radiation through such end structure. When "reflective", the ends are made to reflect the solar radiation back into the trough 32, and when "transparent" the solar radiation is free to enter the trough 32 past the end thereof. This makes it possible, when the sun is shining on the outside of an end of the trough, to admit the sun's rays through such end and, at the same time, to reflect back into the interior of the trough the rays of the sun which would otherwise pass out through a transparent end or be absorbed by a non-reflective end. For example, when the trough is positioned with its length extending in a substantially east-west orientation, during the morning hours the eastern end of the trough is rendered transparent and the western end is made reflective. During the afternoon hours, the western end of the trough is rendered transparent and the eastern end is made reflective.

When the trough 32 is positioned with its length extending in a substantially north-south orientation, its length will normally be inclined at an angle to the horizontal determined by the apparent position of the sun in the sky, usually perpendicular to the apparent position of the sun at the meridian during the vernal and autumnal equinoxes. In such case, in the winter months the sun may be low enough to have its rays partially blocked from entry into the trough interior by the southern end of the trough. In such case, the southern end is made transparent during such months, while the north end is made reflective to reflect maximum amounts of the sun's rays back into the trough interior. In the summer, the reverse is true, the north end being made transparent and the south end being rendered reflective as required.

The radiation absorber element 37 may be of any suitable type capable of accepting and utilizing solar radiation, falling directly upon it or reflected upon it by the trough interior for the purpose of utilizing the energy of the solar radiation impinging thereon. Most commonly, the radiation absorber element 37 will be in the form of a conduit or conduits having a working fluid flowing therethrough for the purpose of absorbing and transferring heat energy. It should be understood, however, that other radiation absorbing elements may be utilized, such as thermoelectric devices, photoelectric devices, fuel cells, and other devices capable of utilizing solar radiation concentrated thereon.

As here shown, the radiation absorber element 37 is of the "plate" type including a passage 40 or a plurality of conduits (not shown) having a working fluid flowing therethrough for the purpose of absorbing and transferring heat energy.

Figure 35:
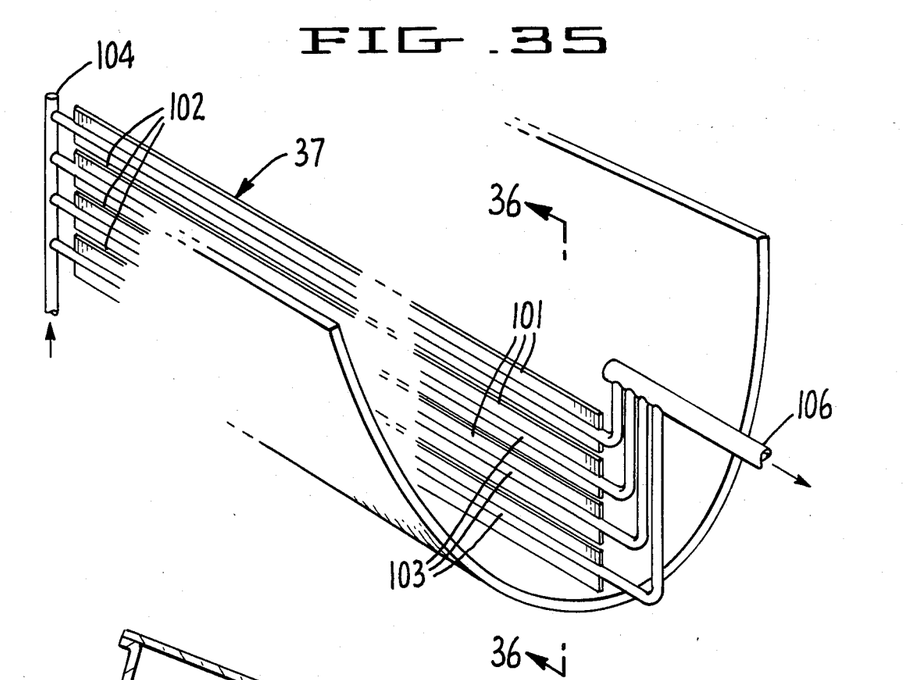
FIG. 35 is a perspective view of a solar radiation absorption device shown in operative association with the trough of the present invention, portions of the view being broken away and shown in phantom for clarity of illustration.
Figure 36:
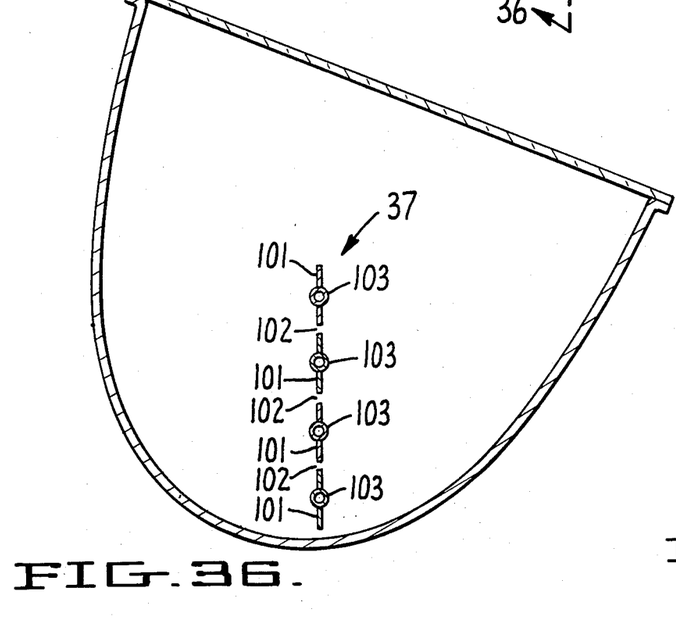
FIG. 36 is a vertical cross-sectional view taken substantially on the plane of line 33—33 of FIG. 32.
Figure 37:
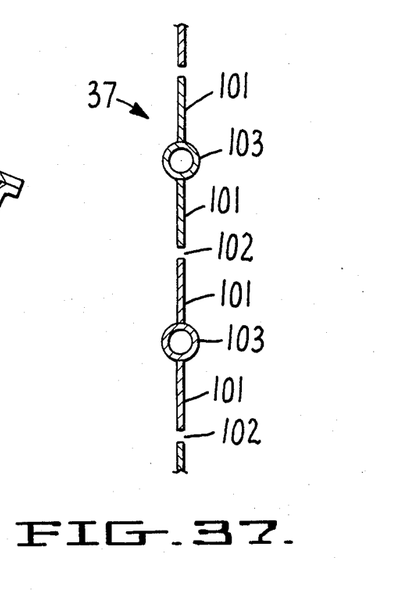
FIG. 37 is a fragmentary vertical cross-sectional view on an enlarged scale illustrating tube and plate structures utilized in the solar radiation absorption device of FIGS. 35 and 36.

In the form of the invention illustrated in FIGS. 35 through 37 of the drawings, the radiation absorber element 37 is made more efficient. Solar radiation reflected from the interior reflective surfaces of a trough may not fall as strongly on some portions of the element 37 as it does upon other portions during different times of day. Some portions of element 37 can receive less solar energy at such times than they radiate, thus creating a negative energy flow thereat.

Figures 32, 34:
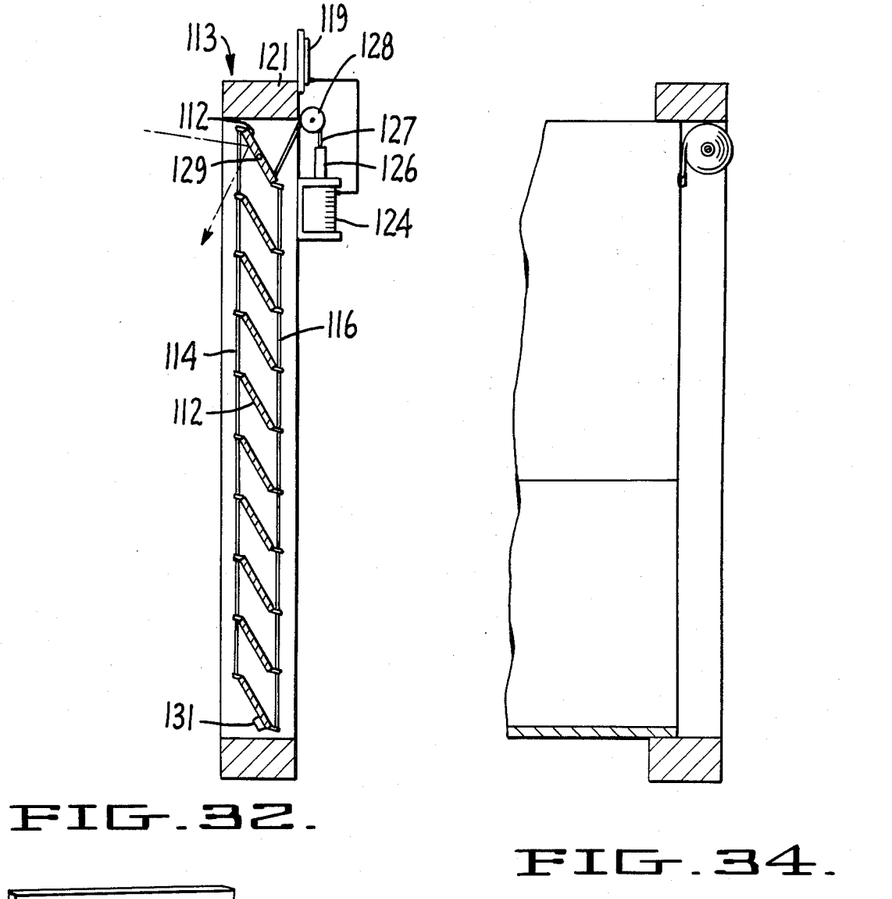
FIG. 32 is a view similar to that of FIG. 31, but showing the slats in an intermediate position.
FiG. 34 is an enlarged cross sectional view taken substantially on the plane of line 34—34 of FIG. 33.
Figure 33:
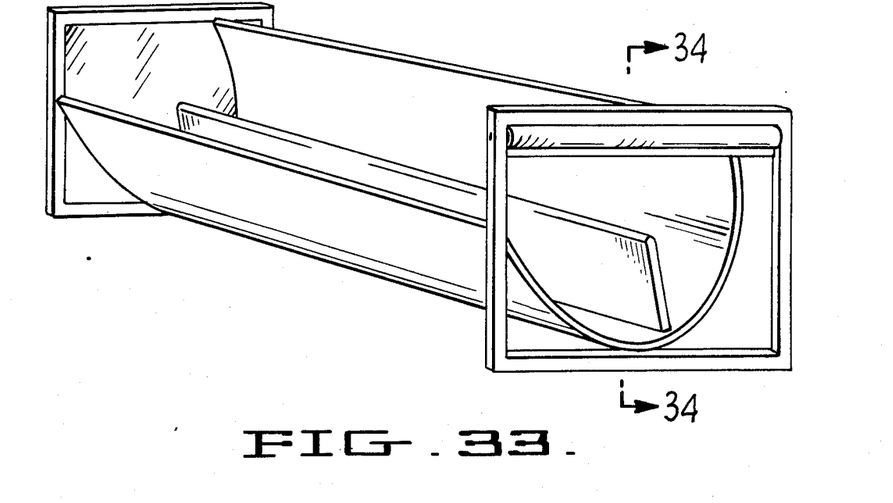
FIG. 33 is a perspective view of a trough similar to that of FIG. 1 and having flexible reflective sheets mounted on rollers carried on frames at the ends of the trough.

As a feature of the present invention, and as illustrated in FIGS. 35 through 37 of the drawings, longitudinal portions of the heat absorption element 37 are isolated from each other so that heat energy will not flow from the hotter portions to the cooler portions and be radiated away. To accomplish this, the element 37 is constructed of a plurality of plate strips 101 extending the length of the trough in coplanar, parallel spaced relation. The gaps 102 between the plates 101 effectively prevent conduction of heat energy from one of the strips 101 to the adjacent strips. Tubes 103 for conducting the working fluid along the element 37 are attached to the plates 101, preferably in the manner best seen in FIG. 34 of the drawings. The tubes 103 are fed from an intake manifold 104 and the tubes are manifolded at their opposite ends to a discharge pipe 106.

The concentrating solar collector of the present invention is particularly suited for use in a thermosiphon solar hot water system, because of its ability to accommodate the receiver at a relatively low elevation. A schematic view of such a thermosiphon solar hot water system 38 is illustrated in FIG. 1 of the drawings, wherein a conventional tank-type receiver 39 is positioned only slightly above the low lying trough 32, receiver 39 being located at the bottom of the trough with its upper end connected to the upper end of absorber element 37 by conduit 41 and its lower end connected by conduit 42 to the lower end of element 37.

Figures 1, 2:
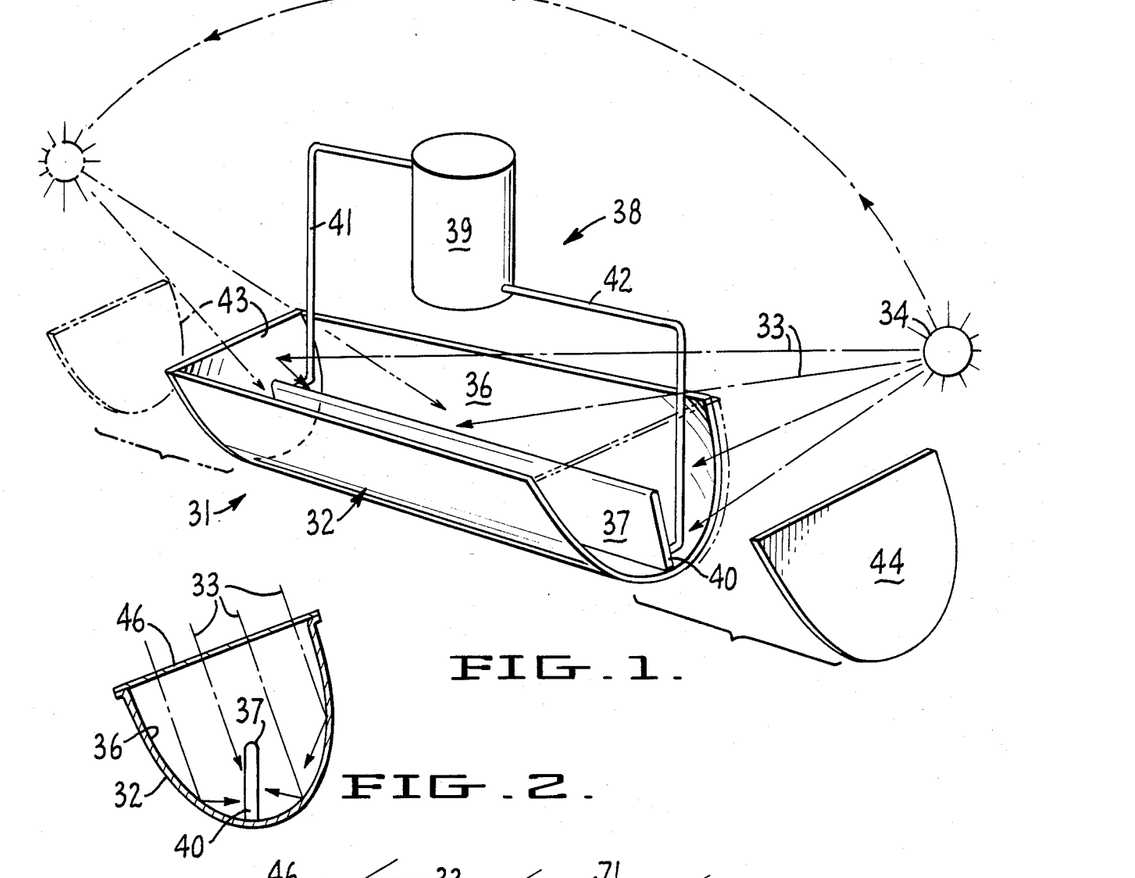
FIG. 1 is a schematic perspective view of a fixed position concentrating solar collector constructed in accordance with the present invention.
FIG. 2 is a typical cross sectional view through a trough constructed in accordance with the present invention.
Figure 3:
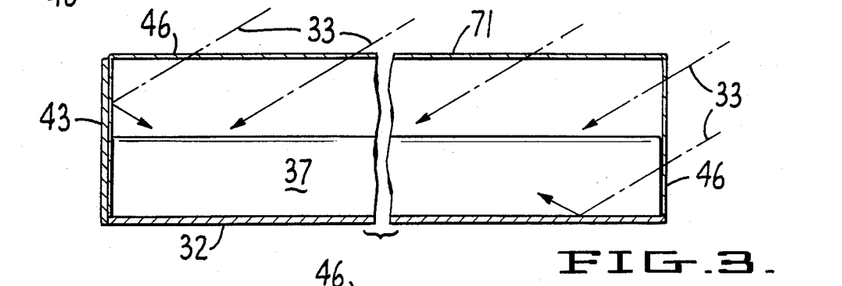
FIG. 3 is a longitudinal sectional view through the trough of FIG. 2 illustrating the configuration of the ends of the trough with respect to one position of the sun.
Figure 4:
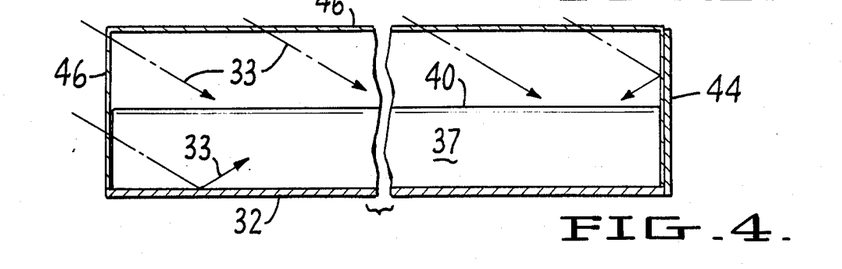
FIG. 4 is a view similar to that of FIG. 3, but illustrating the configuration of the ends of the trough with the sun in a different position.

As illustrated in FIG. 1 of the drawings, the end structures 43 and 44 of the trough 32 are provided in the form of flat panels mountable across the ends of the trough and having the reflective surfaces facing inwardly of the trough. End structures 43 and 44 are removed from the sunward end of the trough and installed in the opposite end to provide the described configuration. In this form, a single end structure obviously could suffice.

The reflective surfaces may be of any suitable form capable of obtaining high efficiency reflection of the sun's rays onto the radiation absorbing element 37. For inexpensive installations, I have found that a sheet of aluminized mylar may be glued to the interior surface of the trough 32 and the ends 43 and 44 to provide good reflective characteristics. Preferably, the interior of the trough is protected against the deposit of dust and other debris which might interfere with the reflective ability of the surface. For this purpose, sheets 46 of a transparent material such as acrylic are mounted across the open top of the trough, and if desired, across the ends of the trough.

Figures 5, 6, 7, 8, 9, 10:
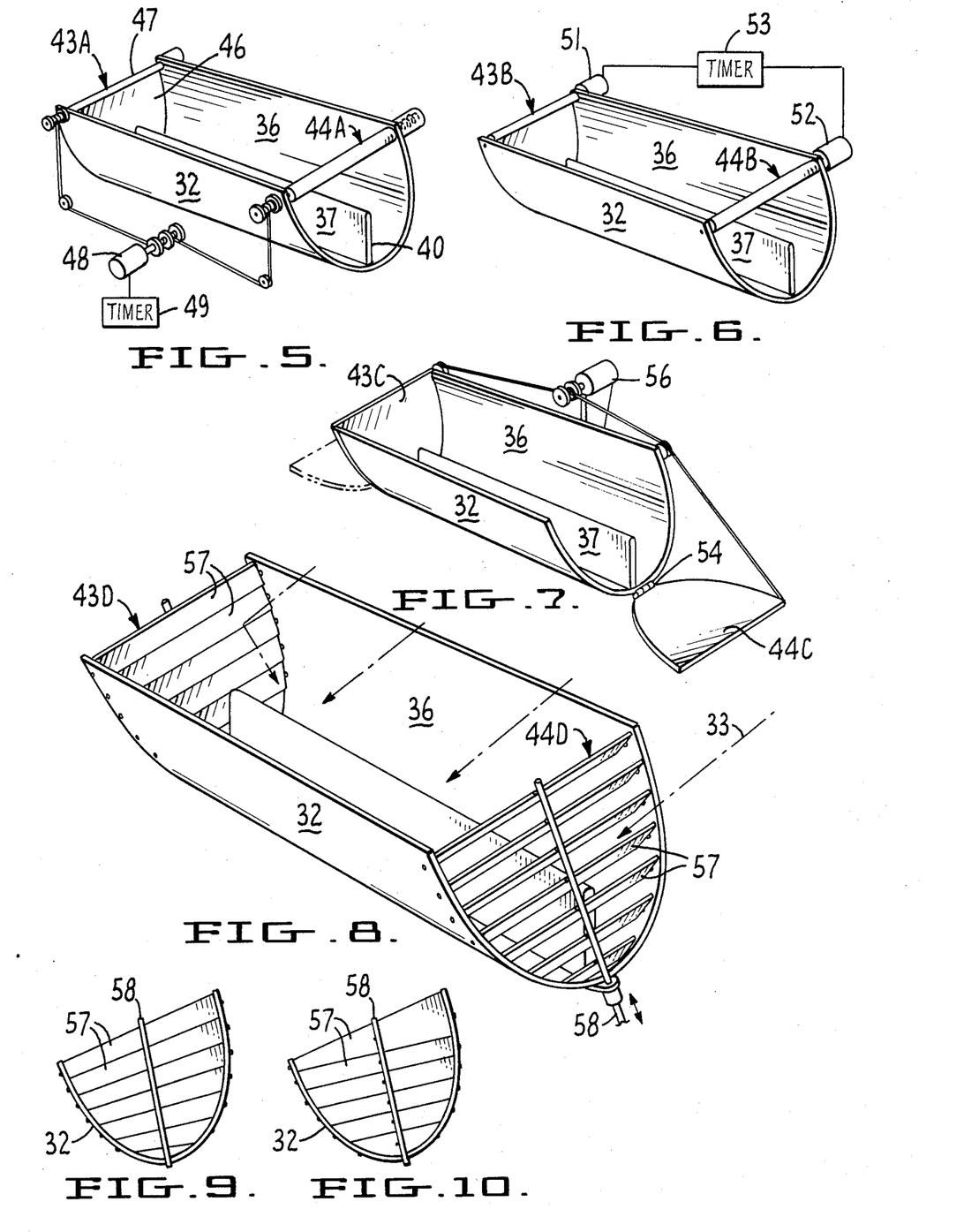
FIG. 5 is a perspective view of a trough constructed in accordance with the present invention and equipped with end structures having a flexible reflective sheet mounted on a roller.
Figure 6 is a view similar to that of FIG. 5, but illustrating modified means for actuating the roller.
FIG. 7 is a view similar to that of FIG. 5, but illustrating a different form of trough end structure.
FIG. 8 is an enlarged view taken similarly to that of FIG. 5, but illustrating trough end structures comprising movable parallel reflective slats.
FIG. 9 is an end view of the trough of FIG. 8 illustrating one configuration of reflective slats.
FIG. 10 is a view similar to that of FIG. 9, but illustrating a different configuration of reflective end slats.

As a feature of the present invention, means is provided for automatically rendering transparent the end of the trough 32 which would block entry of the sun's rays into the trough were such end opaque, and for rendering reflective the opposite end of the trough. As shown in FIGS. 5 through 7 of the drawings, means for automatically changing the clear-reflective character of the trough ends is provided by powered apparatus capable of positioning a reflective end structure either across the end of the trough, to make such end reflective, or away from such trough end to make it transparent.

In the form of the invention illustrated in FIG. 5 of the drawings, the end structures 43A and 44A are each provided by a flexible, reflective sheet 46 carried on a roller 47 mounted across the trough at each end. The reflective sheets 46 on each of the end structures 43A and 44A are selectively movable into covering relation across the trough end simply by unrolling the sheet 46 from the roller 47 (as shown at 43A). Sheet 46 is wound back up on roller 47 by reversing the direction of rotation of that roller (as shown in 44A) to substantially clear that end of the trough. As here shown, the rollers 47 are operated by a two way electric motor 48 controlled by a timer 49 synchronized with the apparent position of the sun relative to the trough 32.

It should be understood that the present invention contemplates controlling the movement of the end structures 43 and 44 selectively to render the trough ends reflective or transparent to solar radiation in accordance with the apparent position of the sun. As pointed out above in connection with the description of FIG. 5 of the drawings, control means for operating the automatic means may be in the form of a timing device synchronized with the apparent position of the sun from the vantage point of the trough. It is also contemplated that the control means can be directly responsive to the position of the sun relative to the trough by being responsive to the impingement of solar radiation. Thus, the means for automatically moving the end structures 43 and 44 between the clear and reflective modes may consist of conventional moving devices directly responsive to impingement of the sun's rays thereon. Such devices may include bimetallic elements, siphon tubes, bourdon tubes, etc.

In the form of the invention illustrated in FIG. 6, the end structures 43B and 44B are similar to the end structures 43A and 44A illustrated in FIG. 5 of the drawings, but are driven by separate electric motors 51 and 52 controlled by a timing device 53.

I have found it convenient and effective in certain installations to mount the end structures, such as reflective sheets 46, on frames 45 positioned at the ends of the trough 32, but not necessarily connected thereto. The frames 45 provide the necessary support for rollers 47 and the reflective sheets 46 carried thereon. Obviously, each of the end structures illustrated in the drawings can be mounted in frames such as frames 45, see for example the mounting of slats 112 in such a frame as illustrated in FIG. 28.

FIG. 7 illustrates a trough structure similar to that of FIG. 1, but in which the end structures 43C and 44C are hinged at 54 to the trough 32 and are selectively moved into clear and reflective positions by an electric motor 56, which may be controlled by a timing device or by a solar position responsive device (not shown).

FIGS. 8 through 10 of the drawings illustrate a different form of the end structures 43D and 44D in which a plurality of reflective slats are mounted across the ends of the trough 32 somewhat in the nature of a venetian blind. When the slats 57 are moved to the closed position illustrated at 43D, they provide the reflective trough end. When the slats 57 are moved as by actuator 58 to the open position illustrated at 44D, wherein the slats 57 are substantially edgewise to the rays 33 of the sun, they afford the clear or transparent trough end. FIG. 9 illustrates slats of tapering shape, while FIG. 10 illustrates parallel slats, except for the top slat.

Figures 27, 28, 29, 30, 31:
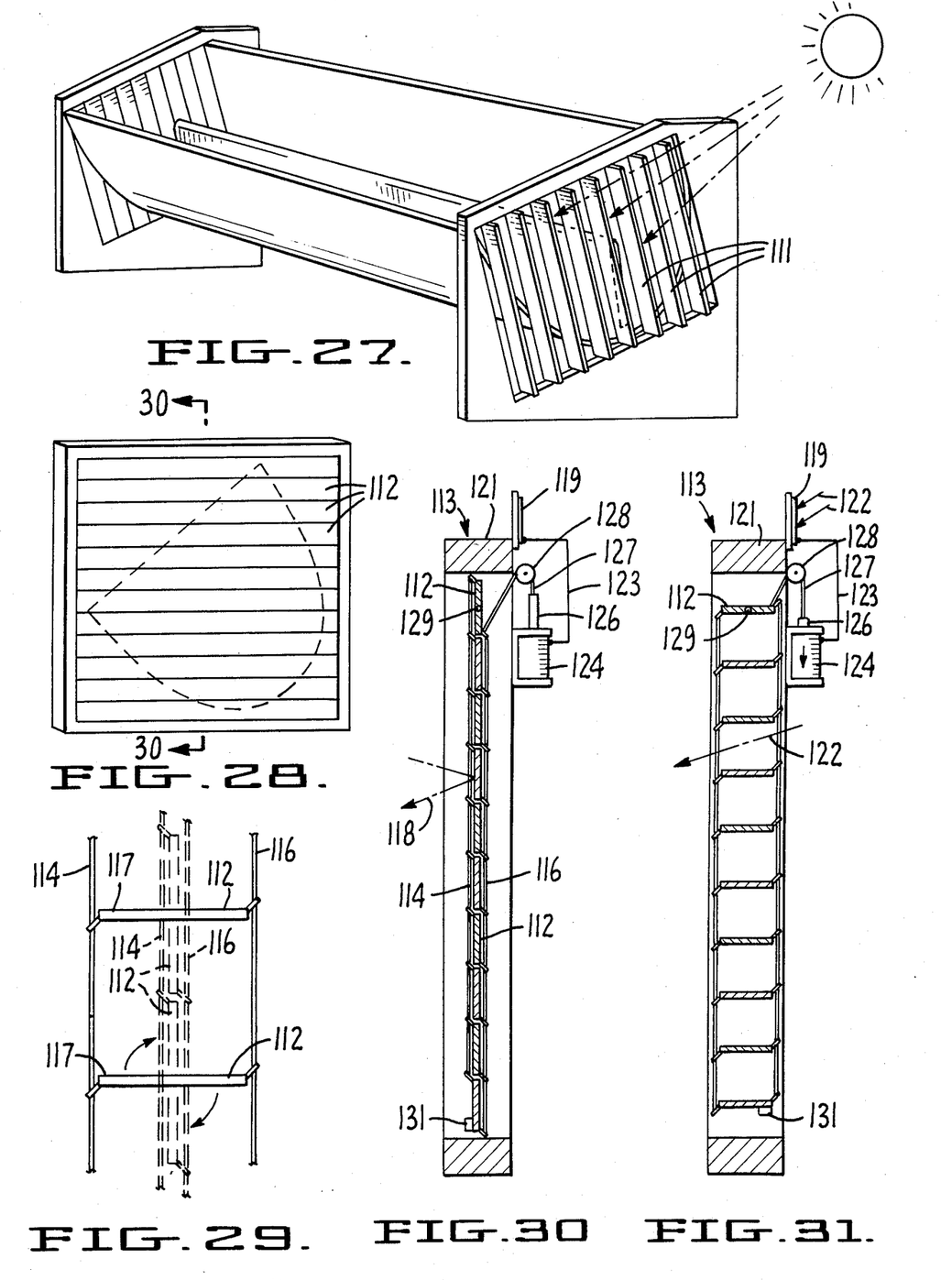
FIG. 27 is a perspective view of a fixed position trough-type solar collector constructed in accordance with the present invention and illustrating a modified end structure utilizing movable parallel reflective slats.
FIG. 28 is a perspective view of a movable parallel reflective slat end structure similar to that illustrated in FIG. 27 but rotated so the slats extend horizontally.
FIG. 29 is an enlarged fragmentary end view of a pair of slats forming part of the apparatus illustrated in FIG. 28 and showing another position of same in phantom lines.
FIG. 30 is a vertical cross-sectional view on an enlarged scale taken substantially on the plane of line 30—30 of FIG. 28 and illustrating the slats placed in their reflective mode by a solar powered control device.
FIG. 31 is a view taken similarly to that of FIG. 30, but showing the slats moved into their position leaving the trough end substantially open and pervious to solar radiation into the trough.

FIGS. 27 through 31 illustrate parallel slat trough end structures which are substantially rectangular, for economy and ease of manufacturing, and which more than cover the ends of trough 32. In FIG. 27, the generally rectangular parallel slat assembly is tilted to correspond to the tilt of the trough 32, and the slats 111 are adapted for either manual or automatic operation.

A rectangular parallel slat assembly in which the slats extend horizontally is illustrated in FIG. 28. Means 113 is illustrated in FIGS. 29 through 31 and is formed for moving the slats 111 or 112 between a first terminal position unblocking passage of solar radiation through the end of the trough 32 and a second terminal position reflecting solar radiation impinging upon the inner reflective surface of the slats back into the trough and hence onto the solar radiation absorption element 37.

As shown in FIGS. 29 and 31, the slats 112 (or 111) are carried in parallel spaced relation on elongated members 114 and 116. Relative endwise movement of members 114 and 116 move the slats 112 to their first terminal position (shown in FIG. 29 and FIG. 31) where they are generally parallel to the rays of the sun entering the end of the trough so as to present as little impediment as possible to the entry of solar radiation into the trough.

When member 116 is moved downwardly with respect to member 114, the slats 112 and members 114 and 116 are moved to the second terminal position shown in phantom lines in FIG. 29 of the drawings and in solid lines in FIG. 30. The faces 117 of slats 112 are reflective to solar radiation so that, when the slats are in the position illustrated in FIG. 30, the rays 118 of the sun trying to pass out of trough 32 through the trough end away from the sun are reflected back into the trough, in the manner illustrated by arrow 118.

As a feature of the present invention, the means 113 is responsive to and is operated by solar radiation so that the slats 112 are swung to their first terminal or "open" position illustrated in FIG. 31 of the drawings when the sun is impinging on the outer side of the device. To accomplish this, a photovoltiac plate 119 is mounted on the frame 121 supporting the slats 112 and members 114 and 116, plate 119 being in position to be impinged upon by the rays of the sun when such rays are coming from a direction attempting to enter the end of trough 32 in which the parallel slat construction is mounted. These rays 122 of the sun cause the photovoltiac plate 119 to generate current which passes through lead 123 to a solenoid 124 which, when energized, retracts its core 126 to pull on wire 127 which passes over pulley 128 and is connected to the side of the uppermost of slats 112 to which member 116 is secured. This causes the slats to rotate in a counterclockwise direction about pivot pin supporting the upper of the slats 112, thus moving the slats to their open position and permit the sun's rays 122 to enter the trough 32.

At such time as the current from photovoltiac plate 119 terminates because the sun's rays are no longer impinging thereon, weight 131 pulls member 116 downwardly, causing the slats 112 to rotate in a clockwise direction as viewed in FIGS. 29 through 31 of the drawings, thus moving the slats 112 to their closed terminal position illustrated in FIG. 30 of the drawings wherein the sun's rays 118 are reflected back into the interior of the trough.

When the sun's rays are coming from a relatively low angle, a vertical reflecting surface at the end of the trough opposite to the sun would tend to reflect the sun's rays at a corresponding angle. This angle can grow so shallow that at least a portion of the reflected sun's rays do not reach the bottom of the trough where the radiation absorber element 37 is located. The adjustable slat structure illustrated in FIGS. 29 through 32 is capable of avoiding this problem by forming the mechanism to adjust the slats 112 to the position illustrated in FIG. 32 of the drawings. As shown therein, the slats 112 are tilted so that the sun's rays 120 are deflected downwardly at a sharper angle than is the case in the position illustrated in FIG. 30 of the drawings.

Figure 11:
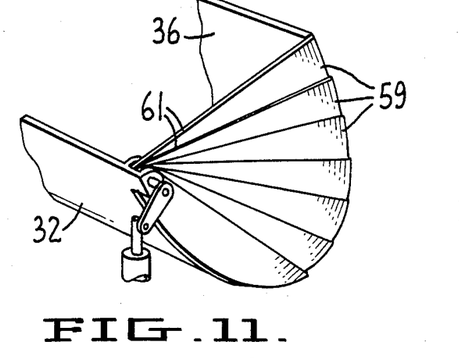
FIG. 11 is a fragmentary perspective view of one end of a trough similar to that of FIG. 5, but having a modified form of end structure.
Figure 12:
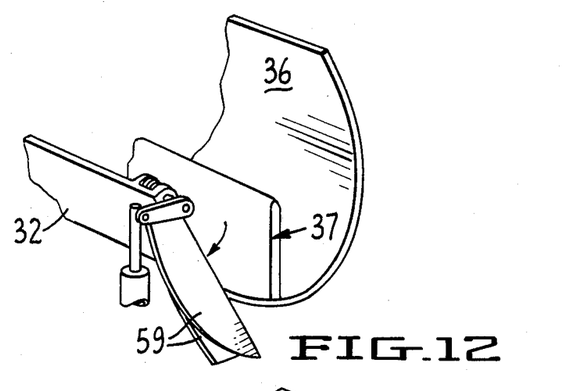
FIG. 12 is a view similar to that of FIG. 11, but illustrating the trough end structure in retracted position.

An alternative trough end structure is illustrated in FIG. 11 of the drawings in which a plurality of side by side thin tapered reflective leaves are mounted to pivot about a common axis so that when the leaves are in the overlapping relation illustrated in FIG. 12 of the drawings, the trough end is substantially open and transparent to solar radiation, and when the leaves 59 are in the fanned out position illustrated in FIG. 11, the trough end is substantially closed and interiorly reflective.

Figure 13:
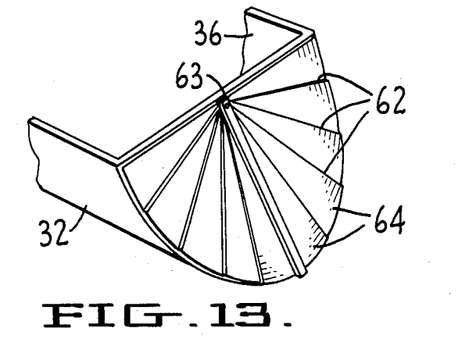
FIG. 13 is a view similar to that of FIG. 11, but illustrating a modified trough end structure.
Figure 14:
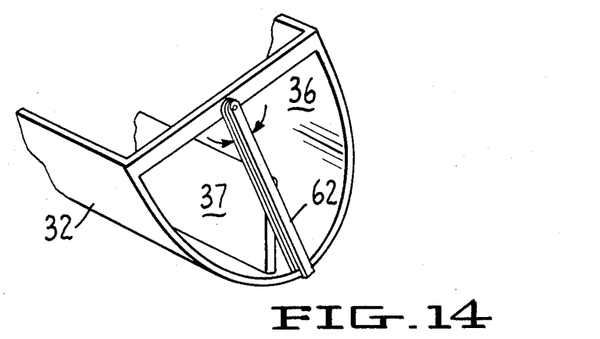
FIG. 14 is a view similar to that of FIG. 13, but illustrating the trough end structure in folded position.

In FIGS. 13 and 14, the trough end structure is in the configuration of a folding fan having a plurality of elongated stiffeners 62 pivoted at one end 63 about a common axis in overlapping relation, and a flexible web 64 joining adjacent stiffeners 62, the fan structure being reflective on its surface facing the interior 36 of the trough 32. FIG. 13 illustrates the end structure in its open position, leaving the trough end substantially closed and reflective, while FIG. 14 illustrates the fan structure in its closed position leaving the trough end substantially open and reflective.

FIGS. 15 and 16 illustrate another form of the invention in which the trough end structure is provided by an inflatable bag 66. FIG. 15 illustrates the bag 66 in its inflated condition closing off the trough end and providing the desired reflective surface on its inner side. FIG. 16 illustrates the bag 66 in its deflated condition, leaving open the trough end.

Figures 17, 18:
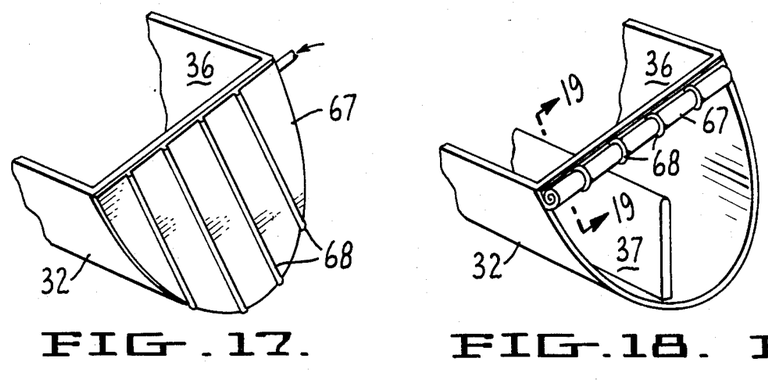
FIG. 17 is a view similar to that of FIG. 11, but illustrating another modified form of trough end structure.
FIG. 18 is a view similar to that of FIG. 17, but illustrating the trough end structure in retracted position.
Figure 19:
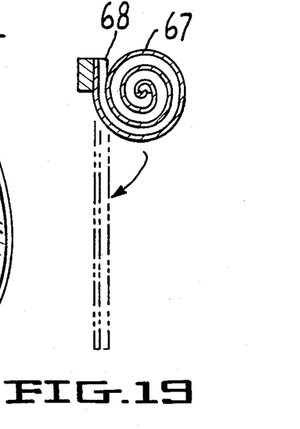
FIG. 19 is an enlarged cross sectional view taken substantially on the plane of line 19—19 of FIG. 18.

FIG. 17 illustrates a trough end structure in which a flexible reflective sheet 67 is mounted on the trough 32 in position to extend substantially across the trough end when the sheet 67 is flattened. Sheet 67 is provided with a plurality of bourdon tubes 68 of the type which are normally curved, but which become straightened out when inflated. Thus, when tubes 68 are inflated, attached sheet 67 is flattened out into covering relation to the end of trough 32, sheet 67 being reflective of its inner surface. FIG. 17 illustrates the flattened condition of sheet 67 caused by straightening out of the bourdon tubes 68. FIGS. 18 and 19 illustrate sheet 67 curled up out of covering relation to the trough and by the curling up of the bourdon tubes so as to leave the trough end open and transparent to solar radiation.

The described structures may be utilized to increase the efficiency of any trough-type collector. Efficiencies of trough-type collectors range from quite poor for simple rectangular boxes to quite good for semicylindrical troughs. However, I have found that efficiency can be materially increased by forming the interior reflective surface of the trough to provide good performance over a range of angles of incoming solar radiation. This makes practicable fixed or non-tracking mounting of the collector.

Figure 20:
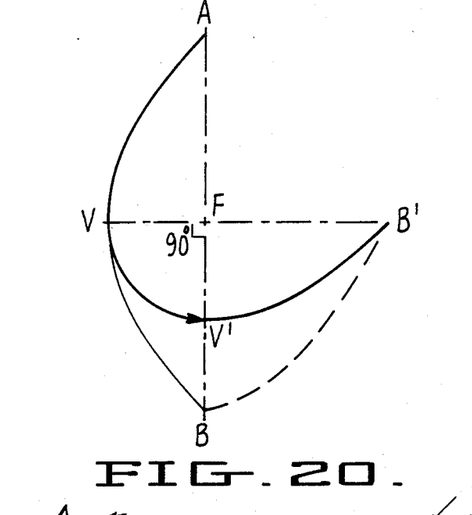
FIG. 20 is a diagrammatic view of a compound parabolic curve utilized as the transverse plane profile curve of the internal reflective surface of a solar collecting trough constructed in accordance with the preferred form of the invention.

The key to this feature of the present invention is the shape of the reflective surface. FIG. 20 illustrates the shape of the reflective surface and how the shape is arrived at. As shown in FIG. 1, a parabola AVB is shown having V as the vertex and the line AFB as the latus rectum. To obtain the desired shape, the lower half of the parabola is shifted upwardly about the focus until the lower portion of the latus rectum becomes horizontal.

The desired shape for the reflective surface is now represented by the curve ABV'B' in FIG. 1. The curve is composed of half a parabola, AV, a quarter of a circle, BB', and the other half of the parabola, V'B', which has been shifted 90° in the manner described. The distance between the focus of the parabola and its vertex is equal to the radius of the quarter circle and the focus of both of the half parabolas and the quarter circle are in the same position.

FIG. 2 illustrates a cross-section through a trough having an internal reflective surface defined by a compound parabolic curve in accordance with the present invention. In this figure, a clear sheet 46 of transparent material such as thin glass, acrylic plastic, or the like, is mounted across the open top of the trough to keep out dust and dirt. The solar rays are shown entering perpendicular to the sheet 46 and being bounced by the reflective surface of the trough to impinge upon the radiation absorber element 37.

Figure 21:
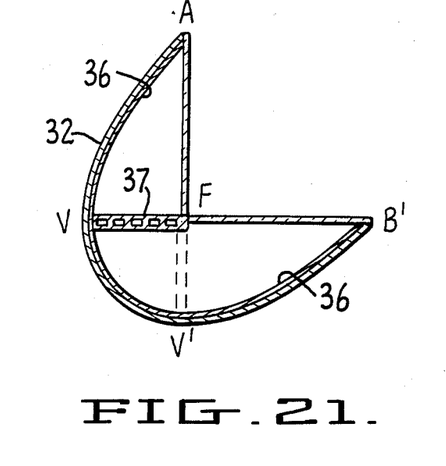
FIG. 21 is a cross sectional view of a solar collecting trough utilizing the compound parabolic curve plane profile of the internal reflective surface illustrated in FIG. 20.
Figures 22, 23, 24, 25, 26:
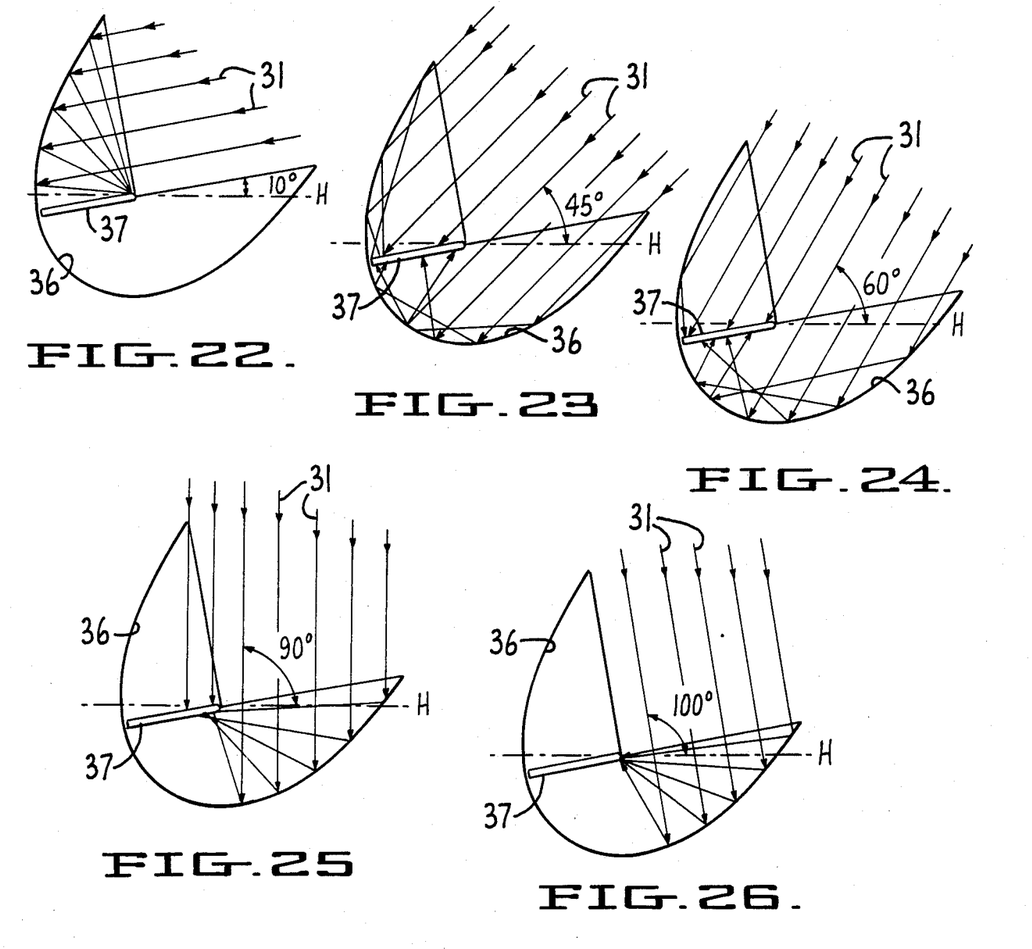
FIG. 22 is a diagrammatic view of the solar trough of the present invention showing solar insolation emanating from a position approximately 10° above the horizon.
FIG. 23 is a view similar to that of FIG. 22, but illustrating solar insolation emanating from a position approximately 45° above the horizon.
FIG. 24 is a view similar to that of FIG. 22, but illustrating solar insolation emanating from a position approximately 60° above the horizon.
FIG. 25 is a view similar to that of FIG. 22, but illustrating solar insolation emanating from a position at the meridian.
FIG. 26 is a view similar to that of FIG. 22, but illustrating solar insolation emanating from a position approximately 100° from the horizontal.

FIG. 21 illustrates a solar collector trough construction utilizing the compound parabolic curve AVV'B of the present invention. In this form of the trough, transparent sheets 72 and 73 are mounted to extend the length of the trough on the planes AF and AB, respectively. The trough ends AVV'BFA can be solid and opaque, but, as pointed out supra, making the ends transparent will increase the efficiency of the solar collector, as will making the internal sides of the ends reflective. The greatest efficiency is obtained by making the sunward end transparent and the opposite end reflective.

The described preferred configuration of the trough 32 to provide a plane profile curve defined by the compound parabolic curve of the present invention permits location of the radiation absorber element 37 at any position between the horizontal latus rectum VF and the vertical latus rectum V'F, because the focus of each of the half parabolas and the focus of the circle coincide.

FIGS. 22 through 26 show how the solar collector trough of the present invention collects a significant amount of solar radiation at angles from 10° from the horizontal when the solar collector is set at an angle in which a line drawn from the foci of the half parabolas and quarter circle through the edge of the trough is inclined at an angle of 10° above the horizontal. These drawings show how the solar collector can be used to good advantage in locations such as Hawaii. The 10° tilt allows for collection of solar radiation for most of the day dring the summer months when the altitude of the sun exceeds 90° in Hawaii. Solar radiation coming from angles 10° and less will be lost, but this loss is small as only a small portion of the total solar insolation striking the solar collector during the day comes in at angles less than 10° from the horizontal.

In other areas of the world, at different latitudes, the tilt of the solar collector is set to optimize performance for that location. The use of the solar collector also is a factor in determining tilt. The angle between the half parabolas, which in the preceding description is 90°, can be changed if it is determined that better performance can be obtained at a different angle.

By enclosing the radiation absorbing element 37 within a vessel made of glass or plastic, heat loss can be greatly reduced, especially if a vacuum is created between the vessel and the radiation absorber element. The use of a non-reflective surface such as black chrome will also help in minimizing heat loss from the radiation absorber elements.

From the foregoing, it will be seen that I have provided an improved fixed position concentrating solar collector in which efficiency of collecting solar radiation is enhanced through provision for making the sunward end of the trough transparent to solar radiation and making the other end of the trough reflective for bouncing solar radiation impinging thereon into the trough interior. The present invention also teaches improving the efficiency of solar energy collecting troughs by utilizing a configuration of the reflective surface in which the plane profile thereof defines a compound parabolic-cylindrical-parabolic curve.

What is claimed is:

1. In a solar collector having a reflective trough directing entering rays of the sun onto a heat absorbing element, convertable end structures formed for rendering the trough ends selectively penetrable to the rays of the sun and internally reflective to solar radiation, and control means for said convertable end structures automatically operating said convertable end structures to make the sunward end of said trough penetrable to the rays of the sun and the opposite end of said trough reflect the sun's rays encountering same into said trough.

2. End structures as described in claim 1, and wherein said control means comprises a timing device synchronized with the apparent movement of the sun relative to said trough.

3. End structures as described in claim 1, and wherein said control means is responsive to radiation from the sun.

4. A fixed position concentrating solar collector, comprising a structure providing an elongated open trough mountable in position to admit the sun's rays to the interior thereof, reflective surfaces on the interior of said trough formed for directing the sun's rays entering said trough onto a focal area, a radiation absorber element positioned in said focal area, and adjustable means at the opposite ends of said trough formed for rendering such ends selectively reflective of and penetrable to the rays of the sun at different times of the day, the end of said trough farthest from the sun being formed to reflect the sun's rays into said trough and the end of said trough nearest the sun being formed to allow the sun's rays to enter said trough substantially unimpeded.

5. A fixed position concentrating solar collector as described in claim 4, and wherein said trough extends in a generally east-west orientation, and said adjustable means is formed for permitting entry into said trough of the sun's rays through the eastward of said ends and for rendering reflective internally of said trough the westward of said ends ante meridian, and said adjustable means is formed for permitting entry of the sun's rays into said trough through the westward of said ends and for rendering reflective internally of said trough the eastward of said ends post meridian.

6. A fixed position concentrating solar collector as described in claim 4, and wherein said adjustable means is provided with actuators responsive to the position of the sun relative to said trough for automatically rendering transparent the end of said trough which would otherwise block entry of the sun's rays into said trough, and at the same time rendering reflective the opposite end of said trough so as to reflect the rays of the sun therefrom into said trough.

7. A fixed position concentrating solar collector as described in claim 4, and wherein said ends of said trough are provided with a flexible reflective sheet carried on a roller mounted across said trough at each such end, and control means is provided for selectively rolling up said sheet on said roller to make the trough end thereat penetrable to the rays of the sun and for selectively unrolling said sheet into covering relation across said end of said trough to reflect the sun's rays impinging upon said end into said trough.

8. A fixed position concentrating solar collector as described in claim 4, and wherein said control means is powered, and a timing device is connected to said control means and is formed for causing said adjustable means to selectively reflect the sun's rays into said trough at the end of said trough farthest from the sun and allow the sun's rays to enter said trough substantially unimpeded in accordance with the position of the sun.

9. A fixed position concentrating solar collector as described in claim 4, and wherein said adjustable means at the ends of said trough comprise rigid generally flat closures having a reflective surface interiorly of said trough, said flat closures being hinged to said trough and formed for selective movement to a position not blocking entry of the sun's rays and permitting the sun's rays to enter said trough through its ends substantially unimpeded.

10. A fixed position concentrating solar collector as described in claim 4, and wherein said adjustable means at the ends of said trough comprise a plurality of slats having reflective surfaces mounted across each of said ends of said trough and jointly movable between a first position generally edgewise to the sun for making such end of said trough penetrable to the rays of the sun and a second position substantially covering said end of said trough with said reflective surfaces facing the interior of said trough.

and means for selectively moving said slats between said first and second positions.

11. A fixed position concentrating solar collector as described in claim 10, and wherein said means for selectively moving said slats comprises a supporting structure at each end of said trough, pivot means at the opposite ends of the uppermost of said slats formed to support said uppermost slat on said structure for pivotable movement between a first terminal position in which said uppermost slat is substantially horizontal and a second terminal position in which said slat is substantially vertical, first and second elongated members depending from opposite edges of said uppermost slat and flexibly attached to the opposite edges of the slats below said uppermost slat whereby said movement of said uppermost slat between its said terminal positions moves said slats below said uppermost slat correspondingly, a solenoid operatively connected to said uppermost slat for effecting movement thereof to said first terminal position when said solenoid is energized, a photovoltiac plate having a solar radiation area positioned to receive solar radiation from the sun and furnish electrical energy to said solenoid when the sun is in position for its rays to enter the end of said trough at which the slats operated by said solenoid are positioned.

12. A fixed position concentrating solar collector as described in claim 4, and wherein said adjustable means at the ends of said trough comprise a plurality of side by side thin tapered reflective leaves having ends pivoted about a common axis whereby when said leaves are in overlapping relation said trough end is substantially open and penetrable to the rays of the sun and whereby when said leaves are fanned out said end is substantially closed and reflective interiorly of said trough.

13. A fixed position concentrating solar collector as described in claim 4, wherein said adjustable means at the ends of said trough are in the configuration of an oriental folding fan and comprise a plurality of elongated stiffeners pivoted at one end about a common axis in overlapping relation to each other, flexible webs joining adjacent stiffeners, said webs being reflective on their surfaces facing the interior of said trough, and means for selectively moving said stiffeners between a closed position leaving said end substantially open and penetrable to the rays of the sun and a fanned out open position leaving said end substantially closed and reflective of the sun's rays into the interior of said trough.

14. A fixed position concentrating solar collector as described in claim 4, and wherein said adjustable means at the ends of said trough comprise inflatable bags mounted and proportioned to extend substantially across the width of said trough when inflated, retracting means connected to said bags for retracting said bags when not inflated so as to leave said ends of said trough substantially open when said bags are not inflated, said bags being reflective on their surfaces which face the interior of said trough when said bags are inflated, and means for selectively inflating said bags so as to make the ends of said trough thereat reflective of the sun's rays into said trough.

15. A fixed position concentrating solar collector as described in claim 4, and wherein said adjustable means at the ends of said trough are provided with a flexible reflective sheet having a bourdon tube attached thereto whereby said sheet extends substantially across said end of said trough thereat when said bourdon tube is inflated and is substantially retracted from said end of said trough when said bourdon tube is deflated, inflating means being provided for selectively inflating and deflating said bourdon tube.

16. A solar energy collector, comprising a structure providing an open trough having an internal structure defining a compound parabolic curve composed of one half of a parabola joined by a quarter circle to the other half of said parabola shifted 90 degrees, said internal surface of said trough being reflective to radiation from the sun, said internal surface being formed to reflect the rays of the sun onto a focal area within said trough, and means for selectively rendering the sunward end of said trough substantially transparent to solar radiation and the other end internally reflective of solar radiation into said trough.

17. A solar energy collector as described in claim 16, and wherein said means comprises end structures mountable in covering relation across said ends of said troughs and movable from such covering relation to make said ends of said trough penetrable to radiation from the sun.

18. A solar energy collector as described in claim 17, and wherein control means is provided for automatically moving said end structures to and from said covering relation to said ends of said trough in accordance with the position of the sun relative to said trough.

19. A solar energy collector as described in claim 18, and wherein said end structures comprise a flexible sheet carried on a roller mounted at said ends of said trough.

20. A solar energy collector as described in claim 18, and wherein said end structures each comprises a rigid member hingedly attached to said trough.

21. A solar energy collector as described in claim 18, and wherein said end structures each comprises a plurality of reflective slats mounted across said ends of said trough and selectively movable between a first position generally edgewise to said sun for allowing the sun's rays to enter said trough substantially unimpeded, and a second position generally edge to edge for rendering said ends of said trough reflective internally of said trough.

22. A solar energy collector as described in claim 18, and wherein said end structures each comprises a plurality of side by side tapered leaves having their smaller ends pivotable about a common axis whereby when said leaves are in overlapping relation said trough is substantially open and penetrable to the rays of the sun and when said leaves are fanned out said trough end is substantially closed and reflective internally of said trough.

23. A solar energy collector as described in claim 18, and wherein said end structure is of folding fan configuration having a plurality of elongated stiffeners pivoted at one end about a common axis, and a flexible reflective web joining adjacent ones of said stiffeners.

24. A solar energy collector as described in claim 18, and wherein said end structures each comprises an inflatable reflective member formed to extend substantially across the width of said trough when inflated and to be retracted therefrom when deflated.

25. A solar energy collector as described in claim 18, and wherein said end structures comprise a flexible reflective sheet having a bourdon tube attached thereto, said reflective sheet being formed to extend into covering relation to an end of said trough when said bourdon tube is inflated and to retract from said covering relation when said bourdon tube is not inflated.

* * * * *